United States Patent
Gagnon et al.

(10) Patent No.: US 6,220,423 B1
(45) Date of Patent: Apr. 24, 2001

(54) LUMBER FEED SYSTEM WITH LOAD RESPONSIVE SPEED MODULATION

(75) Inventors: André Gagnon, Chicoutimi; Maurice Brisson, Laval, both of (CA)

(73) Assignee: Denis Compact Chicoutimi, Inc., Quebec (CA)

( * ) Notice: Subject to any disclaimer, the term of this patent is extended or adjusted under 35 U.S.C. 154(b) by 0 days.

(21) Appl. No.: 09/102,062

(22) Filed: Jun. 22, 1998

(51) Int. Cl.[7] .................................................. B65G 43/00
(52) U.S. Cl. .......................................... 198/460.1; 198/577
(58) Field of Search ............................. 198/460.1, 463.5, 198/459.5, 577, 502.2

(56) References Cited

U.S. PATENT DOCUMENTS

| | | | |
|---|---|---|---|
| 3,200,932 | * | 8/1965 | Metz et al. ............................... 198/37 |
| 4,086,496 | * | 4/1978 | Berry ............................... 250/559.15 |
| 4,340,137 | * | 7/1982 | Foster ................................... 198/457 |
| 4,650,061 | * | 3/1987 | Hasenwinkle et al. ........... 198/462.3 |
| 4,879,752 | * | 11/1989 | Aune et al. ............................ 382/141 |
| 4,914,964 | * | 4/1990 | Speiser ................................. 73/865.9 |
| 4,941,100 | * | 7/1990 | McFarlane et al. ............. 364/474.09 |
| 4,972,154 | * | 11/1990 | Bechtel et al. ........................ 324/663 |
| 5,070,995 | * | 12/1991 | Schaffer et al. ................... 198/460.1 |
| 5,079,729 | * | 1/1992 | Nowakowski ...................... 364/559 |
| 5,082,103 | * | 1/1992 | Ross et al. .......................... 198/460 |
| 5,094,282 | * | 3/1992 | Suzuki et al. . |
| 5,097,939 | * | 3/1992 | Shanklin et al. ................... 198/419.2 |
| 5,099,896 | * | 3/1992 | Ritola ................................... 144/357 |
| 5,137,139 | * | 8/1992 | Ruscello ............................... 198/460 |
| 5,232,030 | * | 8/1993 | Knerr et al. ....................... 144/248.6 |
| 5,419,425 | * | 5/1995 | Goater ............................... 198/461.3 |
| 5,429,161 | * | 7/1995 | Allard ............................... 144/248.4 |
| 5,477,117 | * | 12/1995 | Saito ................................ 318/568.22 |
| 5,518,106 | | 5/1996 | Allard . |
| 5,535,873 | * | 7/1996 | Sakamoto et al. ................... 198/434 |
| 5,547,004 | * | 8/1996 | Fransen ............................. 198/419.3 |
| 5,622,203 | * | 4/1997 | Givler et al. ......................... 137/337 |
| 5,622,213 | * | 4/1997 | McKelvie .......................... 144/246.2 |
| 5,653,094 | * | 8/1997 | Kivits et al. ............................ 53/461 |
| 5,730,274 | * | 3/1998 | Loomer ............................. 198/460.1 |
| 5,740,898 | * | 4/1998 | Pearson ................................. 198/382 |
| 5,755,336 | * | 5/1998 | Rudy ..................................... 209/539 |
| 5,755,437 | * | 5/1998 | Ek ......................................... 271/227 |
| 5,813,512 | * | 9/1998 | Andersson et al. ............... 198/459.5 |
| 5,984,301 | * | 11/1999 | Holbert et al. ....................... 271/227 |

\* cited by examiner

*Primary Examiner*—Christopher P. Ellis
*Assistant Examiner*—Khoi H. Tran
(74) *Attorney, Agent, or Firm*—W. Warren Taltavull; Farkas & Manelli PLLC

(57) ABSTRACT

The disclosure describes a system to provide a steady supply of lumber pieces to a board separating device and insure the correct positioning of each lumber piece, at the proper time, thus allowing the separating device to function at a substantially higher rate than hitherto possible with previously known infeeding arrangements.

9 Claims, 6 Drawing Sheets

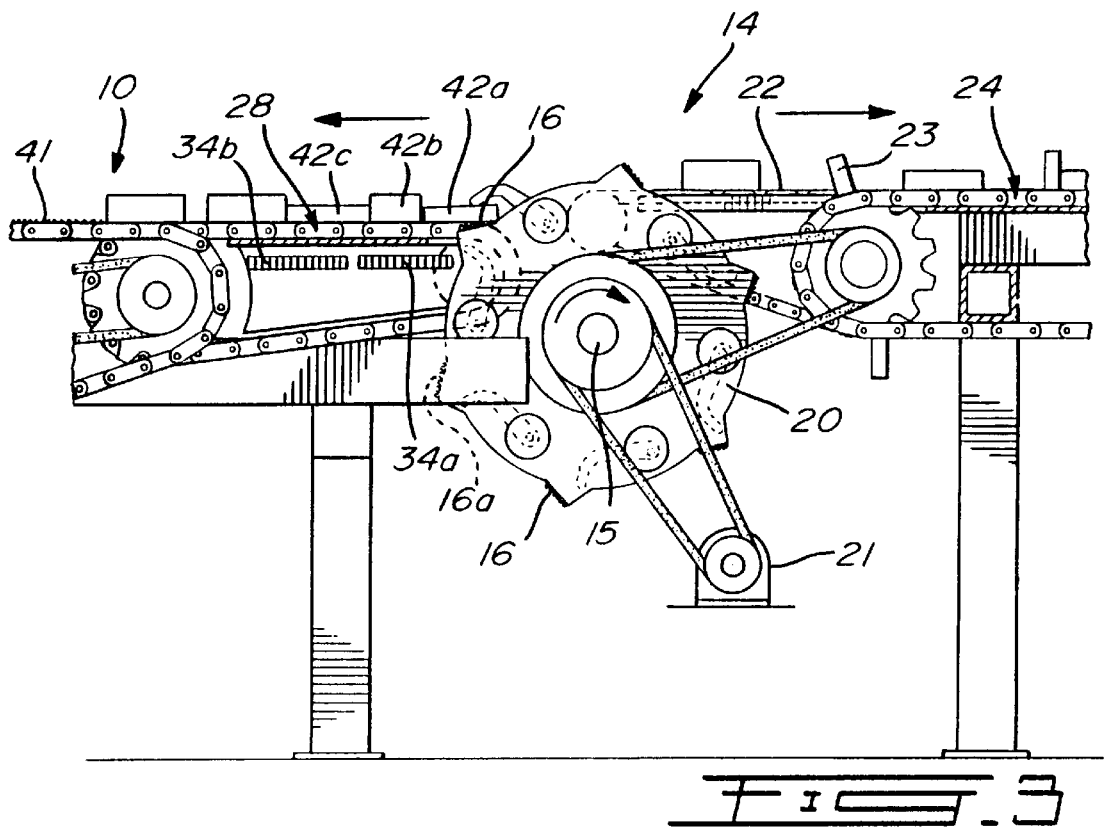
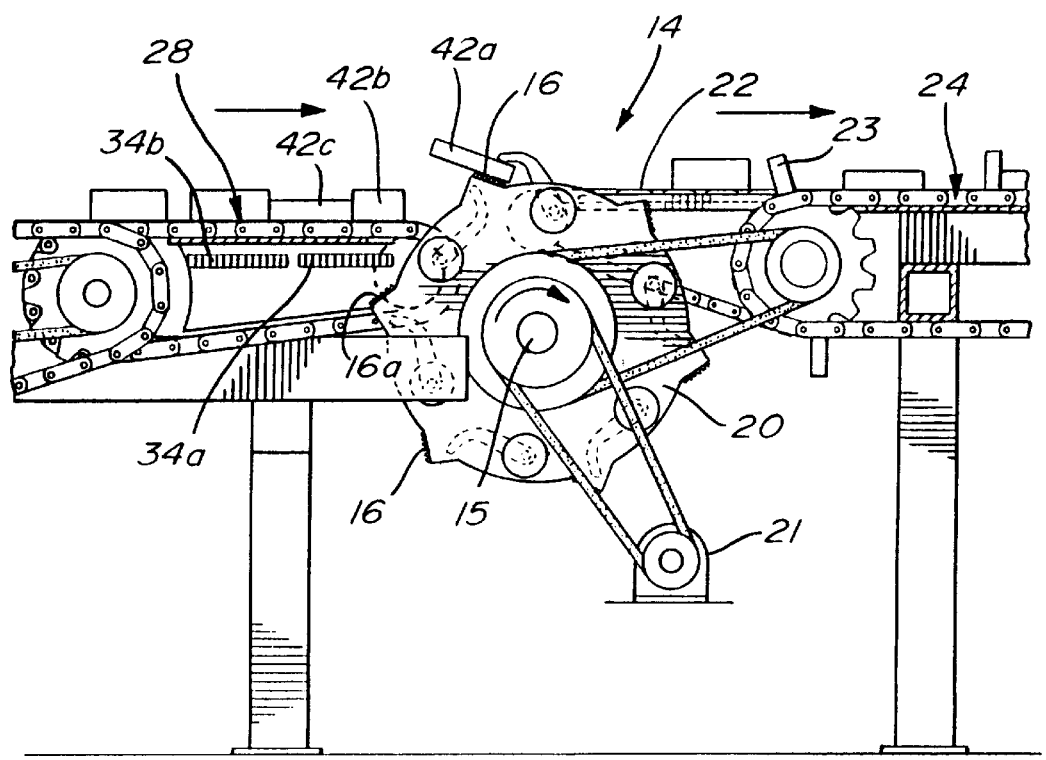

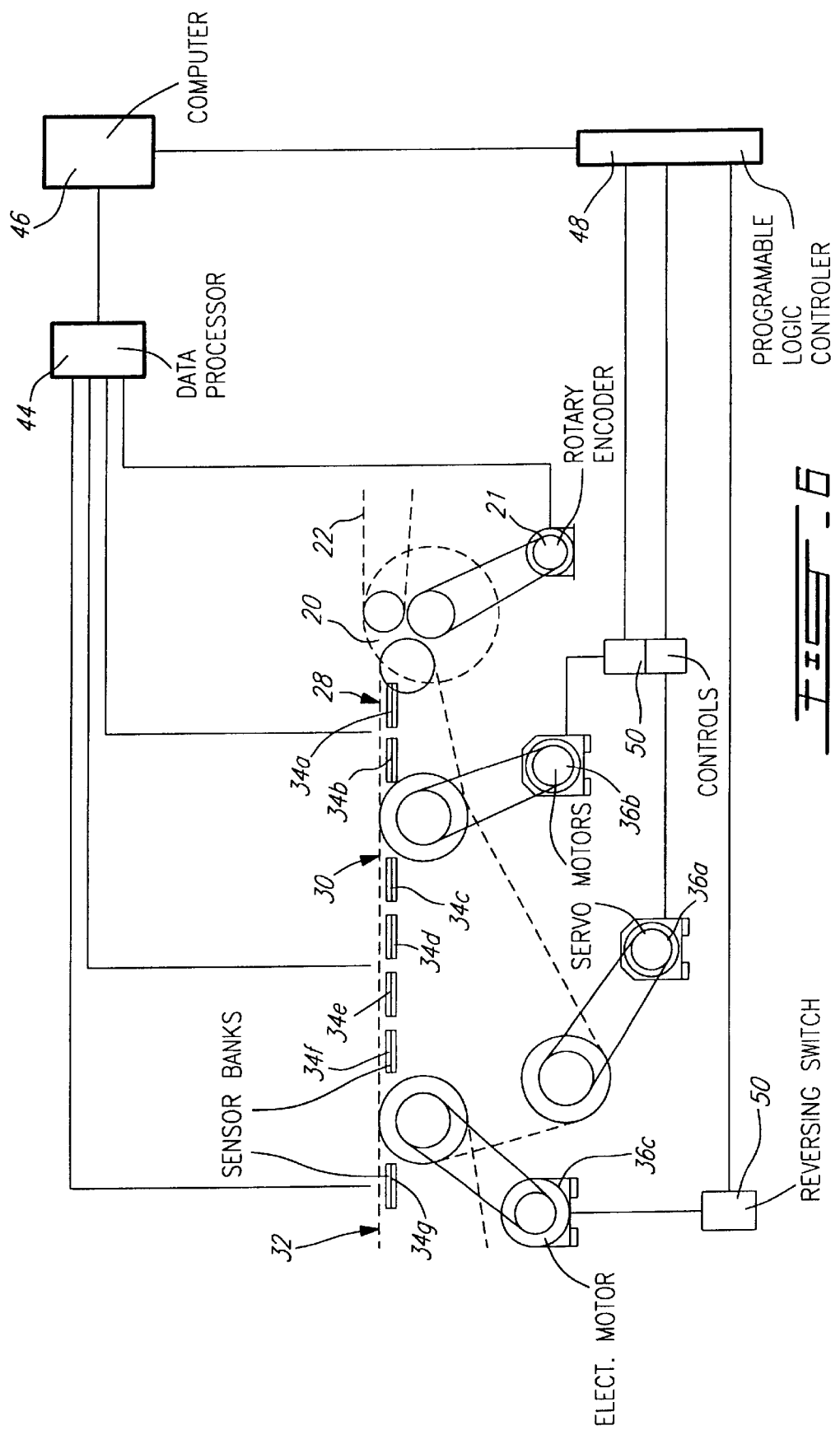

LUMBER FEED SYSTEM WITH LOAD RESPONSIVE SPEED MODULATION

FIELD OF THE INVENTION

The present invention relates to a system to be used as a load sensor and regulator, in front of a high piece count transversal type lumber separator such as, for instance, the one described in U.S. Pat. No. 5,518,106 (B. Allard), dated May 21, 1996. The incoming material consists of four-faced or two-faced lumber pieces carried forward laterally in a single layer by parallel chains, towards the separator whose function is to pick out individually each piece of lumber from the incoming stream and to deposit it in turn between rows of lugs affixed on parallel carry-off chains synchronized with the offloading sequence of the separator.

BACKGROUND OF THE INVENTION

Among the transversal type lumber separators in use today, the apparatus which is the object of the heretofore quoted US patent is considered one of the most efficient performers in the industry, being known to reach piece counts up to 120 per minute, in its original mode of installation. Performance figures, however, have so far been largely influenced by two basic factors particular to the operating conditions, namely: a) the width and length variations of the pieces in the lumber supply, and b) the quality of material flow control in front of the separator. Inadequate regulation of the incoming lumber flow can produce opposite negative effects such as, on the one hand, lack of material at the loading point or, on the other hand, overlapping of pieces due to pressure build up in front of the separating device. It is well known in the industry that a flow of material consisting exclusively of 2"×4" stock of uniform 8' length, does not present as many handling problems as does a production in dimensions from, for example, 1"×4" to 2"×10", in 8' to 16' mixed lengths, and that the capacity of any type of feed system may be greatly affected by the lumber dimension diversity factor.

In any event, and whatever might be the limitations of present day feed systems, production advances in sawmilling have made it necessary to raise the piece count for lumber separators from a ceiling of some 120 pieces per minute, under best conditions, to numbers above 180 per minute; in other words, an increase of some 50% in operating potential is required. This need for extra piece handling capacity stems not only from the process of industrial integration which has caused individual mills to grow in size, but also from a forest resource conservation principle which dictates that more lumber should be produced from the small logs available, including the usable portion of tree tops. While this procedure results in larger production volumes, it also causes a disproportionate increase in the number of pieces to be handled through the various manufacturing stages.

Beyond the need for ever shorter loading/offloading cycles in lumber feeding devices, a further condition is imposed on these systems as a result of present high conversion rate policies which have now firmly established such processes as curved sawing (producing bowed pieces) and marginal edging (causing imperfect squaring off) as basic rules of production. As a consequence, the overall production volume in a modem sawmill contains an important proportion of rough sawn pieces having shape irregularities to be corrected in the final processes of length trimming and kiln stacking. The industry is therefore faced with an urgent need for performance improvements in feeding systems to all processes, more particularly the final ones, where the total mill production is to be separated into a succession of individual pieces for trimming, sorting and stacking.

OBJECTS AND STATEMENT OF THE INVENTION

An object of the present invention is to overcome the performance limitations of board and cant separating feeders presently in use, by means of an auxiliary system which provides precise flow regulation of the input material as well as accurate positional control of individual pieces in the loading area of the lumber separator.

This auxiliary system is located after a lumber supply transfer which itself follows a preliminary unscrambler providing single layering of the pieces. It comprises a first transfer section somewhat shorter than the minimum length of lumber transported; this is followed by a second section which carries the pieces through to the lumber separating device. These two transfer sections used for load control and piece positioning are individually driven (as well as the supply transfer) and all three are equipped with suitably disposed banks of closely spaced presence sensors.

The functions of the above described arrangement can generally be stated as follows:

to insure a continuous, regulated flow of lumber from the supply zone to the loading point in front of the separator;

to prevent "fanning out" (when several pieces of lumber remain together at one end, while spreading away from one another at the opposite end) and "jackstrawing" (a criss-cross situation existing in a group of lumber pieces) of pieces, which are most likely to occur in random length productions;

to maintain close spacing of the pieces but also prevent pressure build-up between them or against the front of the separator; and to provide optimal positioning of the leading piece once it reaches the loading area, and thereafter the proper forward speed with regard to the loading sequence.

The present invention relates to a system for sensing lumber pieces and regulating their movement laterally towards a loading station of a lumber separating device which engages individual lumber pieces to deposit the pieces at a controlled rate on a subsequent process feeding apparatus, the system comprising:

an individually driven first transfer section following a controlled lumber supply transfer; the first transfer section having first lumber conveying means and a first driving unit possessing instantaneous speed modulation and reversal capability;

an individually driven second transfer section downstream of the first transfer section and upstream of the separating device; the second transfer section having second lumber conveying means and a second driving unit possessing instantaneous speed modulation and reversal capability;

first lumber detecting means located along the first transfer section for assessing lumber flow conditions along the first section;

second lumber detecting means located along the second transfer section for assessing lumber flow conditions along the second section and for monitoring position of the leading piece in front of the loading station; and computer means responsive to the first and second detecting means and associated with the first and second driving units to command acceleration, stoppage or reversal of the first and second conveying means.

In one form of the invention, the system also includes third lumber detecting means located in the lumber supply transfer, for controlling the output of lumber to said first transfer section. These third detecting means are linked to the computer means to cause forward/reverse movement or stoppage of the lumber supply transfer individual driving unit hereby designated as the third driving unit.

A critical characteristic of the lumber flow control system consists in the performance of the detecting means in providing full information on load conditions, such as gaps between pieces, skewing of individual pieces and exact position of the leading piece throughout the loading sequence. The combination of such "total situation" scanning with an "all cases" computer program, plus instantaneous mechanical response provided by the particular characteristics of the first and second driving units, constitutes the basis of the present invention and also the required condition for reaching its objective of higher lumber separator performance.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTIONS OF THE DRAWINGS

FIG. 3 shows a first phase of loading the separator;

FIG. 4 shows a second phase of loading the separator;

FIG. 6 is a schematic diagram of the scanning and control elements;

DESCRIPTION OF PREFERRED EMBODIMENT

Figure 1:
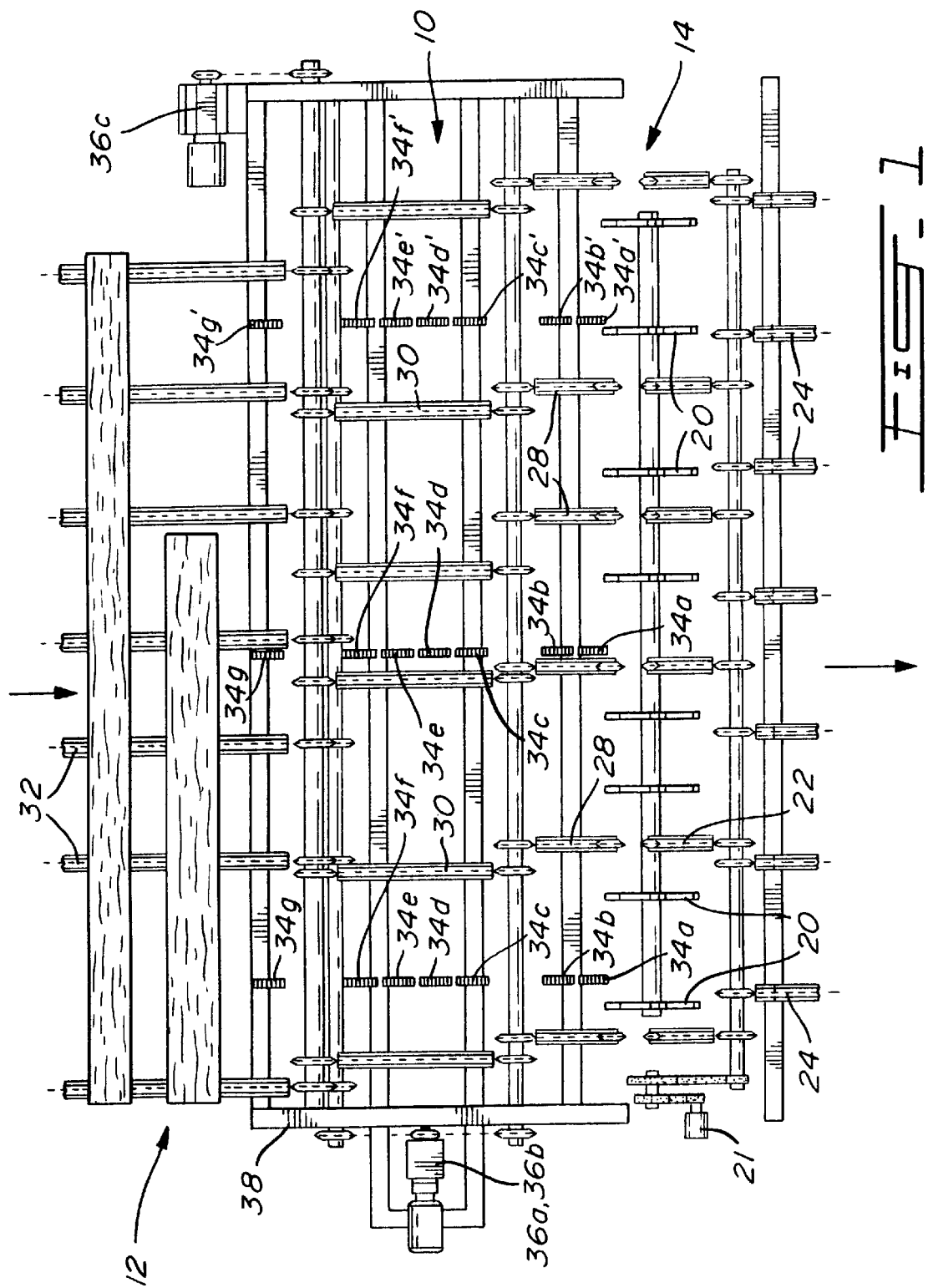
FIG. 1 is a schematic top plan view of the lumber feed system in relation to a separating device.
Figure 2:
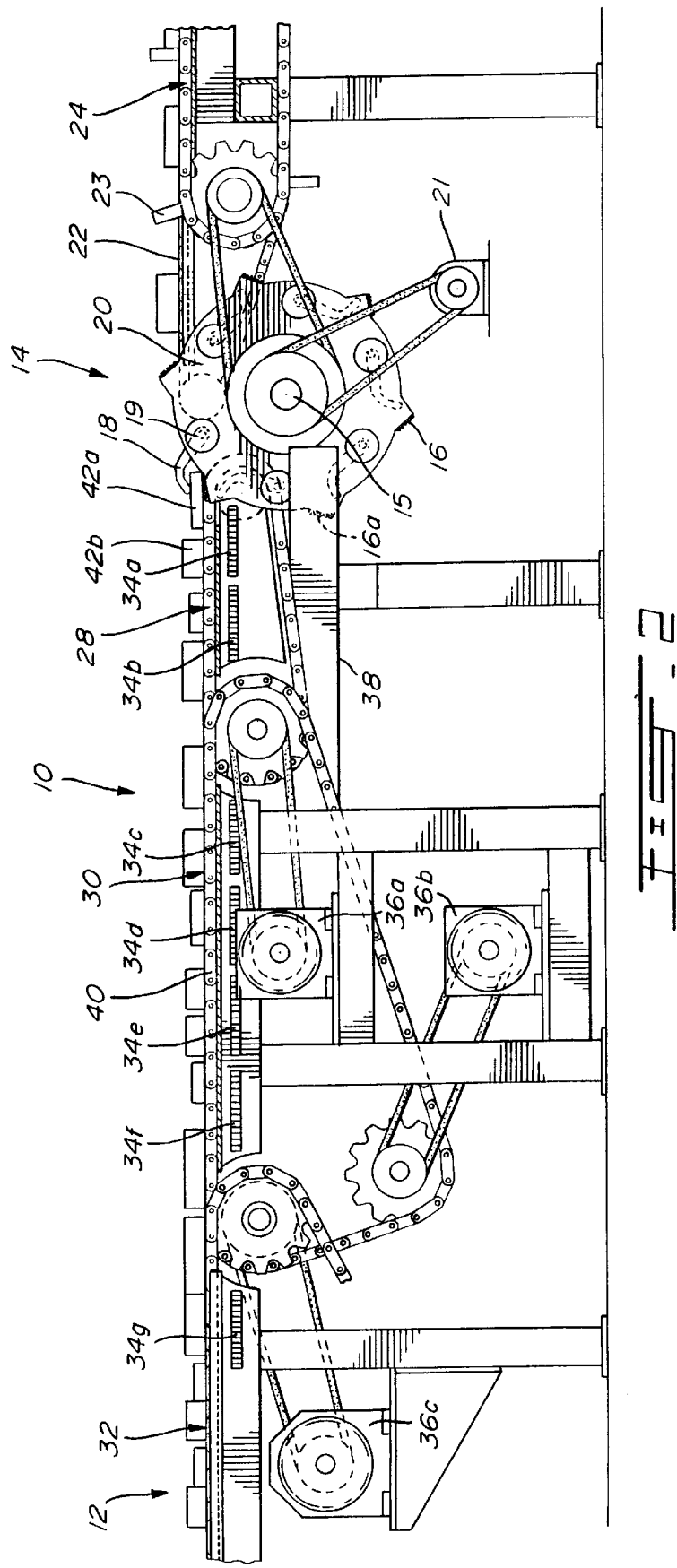
FIG. 2 is a side elevation thereof.

As illustrated in FIGS. 1 and 2, the infeed control system 10 which is the object of the present invention, consists basically of a fixed frame 38 supporting at least two transfer sections 28 and 30, section 28 being shorter than section 30. These sections comprise a multiplicity of parallely disposed carrying chains 40, having a serrated top portion 41, plus an array of sensing elements such as, for example, photoelectric cells 34a to 34f, arranged in at least two lines at longitudinal spacings suitable for their purpose. The distance laterally separating the first two lines of sensors 34a–34f is shorter than the minimal length of a lumber piece processed. A further line of sensors 34a' to 34f' may be required to the right of sensors 34a–34f for longer lumber pieces.

In a preferred form of the invention, the drive units of the individual sections of the control transfers are electric servo-motors having a maximum torque capacity, in either direction of rotation, of more than twice their rated full load torque and a total reversing time not exceeding one tenth of a second. While it is recognized that some level of speed modulation can be reached by hydraulic means, such a control does not produce the speed of response suitable for total cycle times of less than one third of a second for individual piece loading; in fact, it has also been observed that mere temperature variations of the hydraulic fluid caused unacceptable divergences in modulation timing.

The lumber feed system 10, comprising transfer sections 28 and 30, provides full control on the flow of material towards unit 14 which is a typical type of separator used in the lumber industry, whose function is to place incoming boards, such as 42a and 42b, individually between rows of lugs 23 on outfeed chains 24, after they have been carried away from loading discs 20 by offbearing chains 22. Since full details of the separator are given in the previously quoted US patent, it will not be described again here, save to mention that it comprises a number of rotating discs 20 carrying loading stations 16, each equipped with a pivoting hook 18 actuated by a rotator 19.

In front of the controlled feed system 10 is located a lumber supply transfer 12 which is itself preceded by a preliminary unscrambler (not shown) and serves to bring the lumber in a single layer from the production lines. The supply transfer also is individually driven, by a unit 36c which has normal "stop-forward-reverse" functions. This transfer also carries, at the head end, one or more groups of sensors, such as the one shown as 34g for the purpose of causing chains 32 to move forward whenever no lumber is detected in that area, and to stop these chains whenever there is lumber over both sensor groups 34g and 34f.

Once a steady flow of lumber is insured by the above described arrangement, the control function of unit 10 can be fully performed with the purpose of increasing by some 50% the capacity potential of a separator such as shown as 14, or of any existing sequential lumber separator using some configuration of programmed stop levers and rotating feed wheels.

To place the control function of infeed unit 10 in its proper perspective, it must be considered that a high capacity board separator may be required to handle 180 or more pieces per minute, of rough sawn lumber; therefore, the loading-offloading cycle of the unit may be somewhat less than ⅓ second. Generally, the lumber production is of random dimensions, the main part being between 3" and 10" in width, and from 8' to 16' in length. The pieces have not been length trimmed at this point and, because of natural log taper, most have some dimensional deficiency at one extremity. Some also carry excessive wane (rounded edges) somewhere along their length. Finally, many mills nowadays practice some form of curved sawing which produces longitudinal bowing parallel to the thickness dimension in a number of pieces. Given the stated time frame and natural handicaps, it is easy to understand that any auxiliary equipment which can bring each piece to the board separator exactly on time and in the correct position for loading, may well account for a 50% production increase over the normal performance of similar units using conventional infeed transfer systems. The overall increased capacity is brought about by the system of the present invention by first providing a constant supply and accurate flow regulation of the incoming lumber, secondly by exact positional tracking of the leading piece (42b, FIG. 2) and, finally, by precisely modulating the speed of advance for this leading piece to close the gap to the loading point exactly on sequence. Such results depend basically on the combined action of the three main characteristics of the system described:

a) total, detailed and accurate determination of incoming load conditions;

b) adequate computer evaluation of the data and decisional capacity; and c) mechanical capability of instantaneous speed-direction changes in the lumber carrying means.

This control process and its effect on the performance of the board separator 14 can be described as follows, with the help of FIG. 2. The controlled sequence which leads to loading a piece of sawn lumber on the board separator discs 20 begins at the head end of supply transfer 32. The function of this transfer is to remain as fully loaded as possible with single layered pieces, without exerting lateral pressure on the lumber already on the next transfer section 30. This is accomplished by "stop-run-reverse" cycling of drive 36*c*, through computer control, according to whether lumber is perceived by sensor banks 34*f* and 34*g* (stop), by only one of the two foregoing banks (run), or by both the foregoing plus bank 34*e* (reverse).

Transfer section 30 must maintain a fully loaded condition which at no time should become compressed laterally by lumber on supply transfer 32, nor apply similar pressures on transfer section 28. In transfer section 30, servo-motor 36*b* performs the motion cycling, responding to signals originating from sensor banks, 34*b*, 34*c*, 34*d*, 34*e*, 34*f*, and 34*b'*, 34*c'*, 34*d'*, 34*e'*, 34*f'* which are installed along parallel longitudinal lines, as shown in FIG. 1. This arrangement makes it possible to detect "skewing" (non-parallel position) of pieces, by computer count of the individual sensors being energized simultaneously by the passage of a board over two or more opposite banks across the transfer. Upon such a condition being detected, servo-motor 36*b* receives a multiple "stop-reverse-forward" command in a preset timed sequence adequate to bring the misaligned board into parallelism by momentary contact with the incoming lumber load, while causing minimum delay to the overall forward motion. Another function of the transfer section 30 consists in eliminating large voids (such as one board width) in the lumber layer, while maintaining a sufficient gap proportion to constitute a loose but mainly full supply of pieces along its length. Because of the nearly instantaneous response required in all speed and direction changes in this sector, one suitable drive element which can presently meet such conditions is a computer controlled servo-motor.

Figure 5:
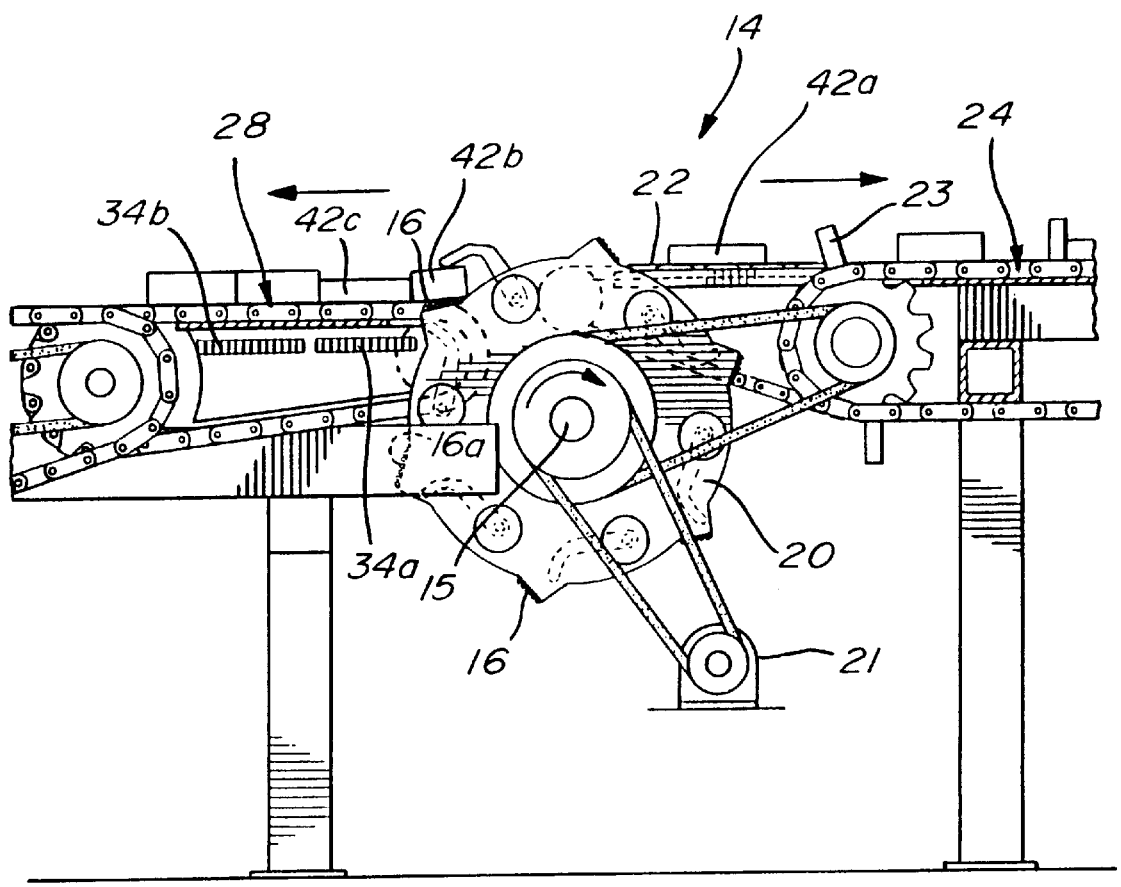
FIG. 5 shows an offloading and reloading phase of the separator.

As illustrated, particularly in FIGS. 3, 4 and 5, the main function of transfer section 28 is to position the lead piece (42*b*, FIG. 3 or 42*c*, FIG. 4) for loading, while the preceding piece (42*a*, FIG. 3 or 42*b*, FIG. 4) reaches a loading station 16 on separator discs 20. At this point, the closely grouped sensors of bank 34*a*, 34*a'* located in front of loading station 16 are measuring the distance which the front edge of leading piece (42*b*, FIG. 3 or 42*c*, FIG. 5) has to cover for said piece to get into loading position. As will be noticed in comparing FIGS. 3 and 5, the width of pieces 42*a* and 42*b* shown in the loading position is the main factor in the length of travel for the following pieces, 42*b* and 42*c* respectively, to reach this loading position. Assuming that pieces 42*a* and 42*b* have a width of 10" and 3", respectively, the distances to be covered by pieces 42*b* and 42*c* in FIGS. 3 and 5 must be at least equal to such assumed width of pieces 42*a* and 42*b*. Since the full loading-offloading cycle must be completed in some cases in less than $\frac{1}{3}$ second, the actual loading phase can be estimated to last about $\frac{1}{6}$ second, which would require average displacement speeds as follows:

a) FIG. 3, for piece 42*b*: 5' per second b) FIG. 5, for piece 42*c*: 1' per second Since the above are average speed values over the total distance travelled, accelerating time and the slippage effect must be factored in, leading to required maximum forward speeds up to 10' per second to be attained during the stated $\frac{1}{6}$ second period of loading, and originating at times from a stopped or a reversed run condition. In such high frequency loading unto a lumber separator such as unit 14, the infeed control system must constantly monitor, through sensor bank 34*a*, 34*a'* the position of the lead pieces (42*b*, FIG. 3 and 42*c*, FIG. 5) within a time frame relative to the arrival into loading position of the next station 16*a* moving up along the circumference of rotating discs 20, and whose position is continuously monitored by encoder 21 driven by rotating shaft 15 on which discs 20 are mounted. From the information transmitted by the sensor bank and encoder, the computer 46 (FIG. 6) calculates instantaneous speed values for servo-motor 36*a* so as to suitably modulate the speed of transfer section 28 carrying pieces 42*b* and 42*c* to the loading station.

In the course of the just described positioning process for the successive lead pieces, whenever a no gap situation is signalled by the sensor banks on transfer section 28, the driving unit 36*a* (FIG. 2) is caused to reverse momentarily in order to relieve the contact pressure of said leading piece against the preceding piece already in loading position and consequently against the circumference of loading discs 20.

Figures 7A, 7B:
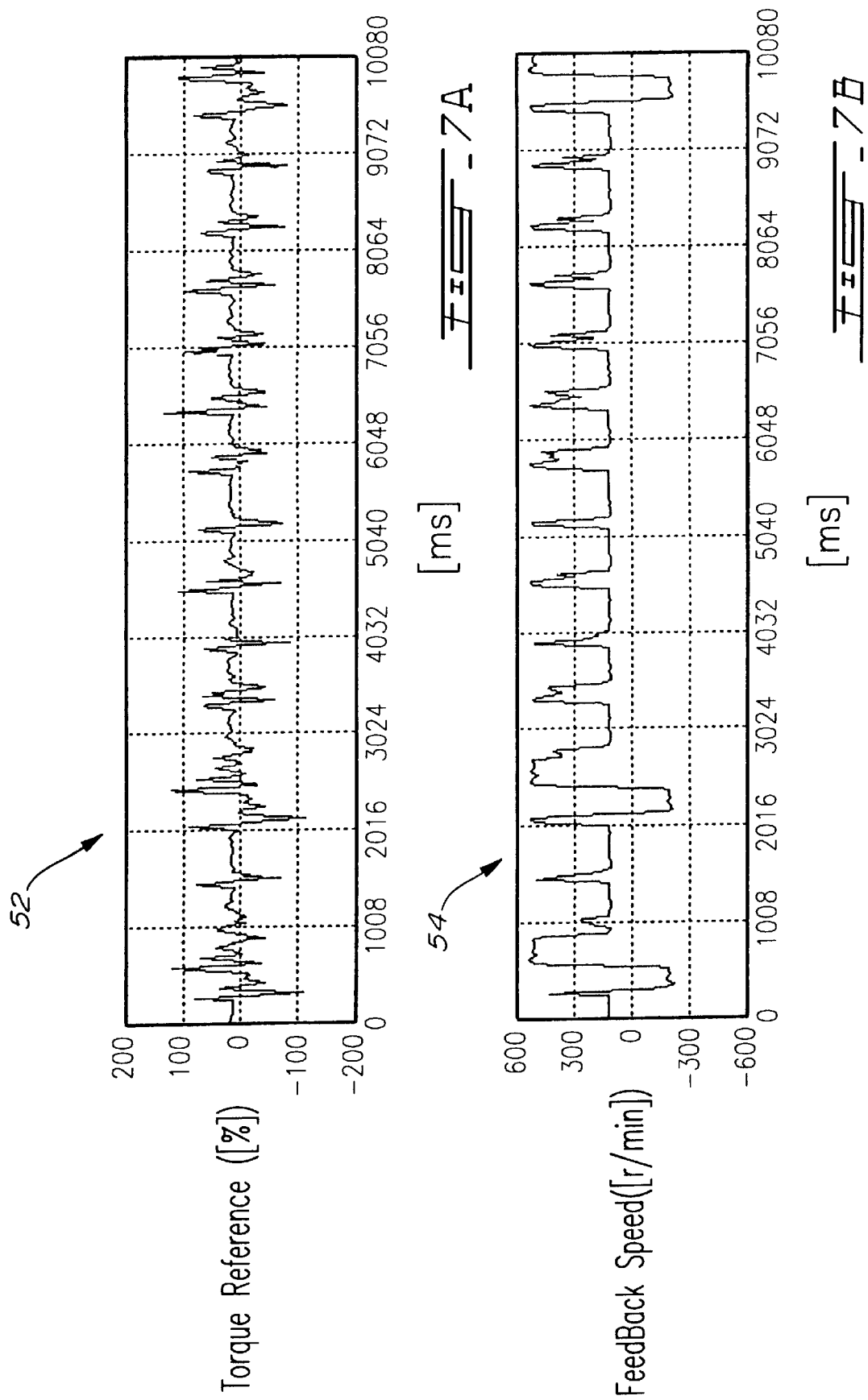
FIG. 7a is a graphical recording of torque in a ten second servo-motor test.
FIG. 7b is a graphical recording of speed in a ten second servo-motor test.

FIGS. 7*a* and 7*b* show values for torque 52 and speed 54, also the frequency of reversals occurring in servo-motor 36*a* driving transfer section 28, over a ten second test period during which eighteen pieces were positioned and loaded unto a lumber separator, at a corresponding cycling rate of approximately one hundred and ten pieces per minute. Since this test, rates of over one hundred and eighty pieces per minute have been reached both in shop tests and under actual working conditions. According to experimental studies, such results can be attained only by the use of computer controlled driving means having a degree of versatility and response as illustrated in FIGS. 7*a* and 7*b* by graphs of servo-motor performance under actual operating conditions. Because of the very narrow limits in time for regulation of speed and direction, it is doubtful that any alternate drive system, particularly if based on hydraulics, would have the required control characteristics and repetitive performance reliability.

The further functions of clamping the loaded piece 42*a* (FIG. 3) by means of pivoting hook 18 and actuator 19, followed by its release downstream (FIG. 5) to a transfer 22 and a lugged chain section 24, are performed by a separator generally as described in the previously quoted US patent and therefore are not discussed here.

Although the invention has been described above with respect to a specific form, it will be evident to a person skilled in the art that it may be modified and refined in various ways. For example, the serrated top chains could be replaced by belts having a roughened top face. It is therefore wished to have it understood that the present invention should not be limited in scope, except by the terms of the following claims.

What is claimed is:

1. A control system for sensing laterally conveyed lumber pieces of varying dimensions, including length whereby said lumber pieces are subject to skewing as a result of lateral pressure between lumber pieces of varying lengths, and for regulating their movement laterally towards a loading station of a lumber separating device making a parallel engagement along the length of individual lumber pieces to deposit said pieces at a controlled rate on a process feeding apparatus, said system comprising:

an individually driven first transfer section following a controlled lumber supply transfer; said first transfer section having first lumber conveying means and a first driving unit possessing instantaneous speed modulation and reversal capability;

an individually driven second transfer section downstream of said first transfer section and upstream of said separating device; said second transfer section having second lumber conveying means and a second driving unit possessing instantaneous speed modulation and reversal capability;

first lumber detecting means located along said first transfer section for assessing lumber flow conditions along said first section, said first detecting means comprising at least two parallel banks of sensor means located opposite from one another;

second lumber detecting means located along said second transfer section for assessing lumber flow conditions along said second transfer section and for monitoring position of the leading lumber pieces in front of said loading section, said second detecting means comprising at least two Parallel banks of sensor means;

wherein said first and second detecting means on said first and second transfer sections are longitudinally disposed so as to perceive gaps between lumber pieces and skewing of lumber pieces; and computer means responsive to said first and second detecting means and associative with said first and second drive units to command acceleration, or reversal on said first and second conveying means to correct gaps and skewing.

2. A system as defined in the claim 1, comprising a third lumber detecting means located in said lumber supply transfer adjacent to said first transfer section for controlling the feed of lumber pieces to said first transfer section, said third detecting means been associated with said computer means and comprising at least two parallel banks of sensor means for early stage detection and correction of lumber fanning out or jackstring.

3. A system as defined in claim 2, wherein said lumber supply transfer comprises third conveying means and a third driving unit of standard AC induction motor type, responsive to said computer means in performing its forward/reverse/stop functions.

4. A system as defined in claim 1, wherein said first and second driving units are computer controlled electric servomotors.

5. A system as defined in the claim 1, wherein said second detecting means being further disposed so as to perceive instantaneous position of the leading piece and command the proper instantaneous transfer speed for "on time" arrival at said loading station of the lumber separating device.

6. A system as defined in claim 1, wherein said first and second driving units cause said first and second conveying means to stop or to move at a varying speed rate in forward or reverse direction.

7. In an apparatus for transversally feeding to a lumber separator, four-faced or two-faced sawn pieces individually, by conveying them to a defined loading position at a constant rate required, said lumber pieces being of varying lengths whereby said lumber pieces are subject to skewing; said system comprising a frame;

means for laterally advancing pieces of lumber side-by-side, said means comprising at least two individually driven transfer sections at joining one another in the longitudinal direction thereof;

at least two banks of sensor means located opposite from one another to detect the presence of lumber pieces on each said transfer section, disposed in such a manner as to perceive the gaps between pieces, skewing of some lumber pieces relative to the rest, and the instantaneous position of the leading piece before loading;

means for individually driving each transfer section, at a varying speed rate in either direction; and computer means to analyze the signals received from said sensor means and issue appropriate commands to the driving means.

8. An apparatus such as defined in claim 7, where each said transfer section comprises a number of parallel disposed carrying means having a serrated top surface to reduce slippage of the lumber pieces.

9. An apparatus such as defined in claim 7, where said individually driving means comprise electric servo-motors with associated control systems.

* * * * *